(12) United States Patent
Ishihara

(10) Patent No.: US 6,399,942 B1
(45) Date of Patent: Jun. 4, 2002

(54) ACTIVE CONFOCAL IMAGE ACQUISITION APPARATUS AND METHOD OF THREE-DIMENSIONAL MEASUREMENT USING SAME

(75) Inventor: Mitsuhiro Ishihara, Aichi-ken (JP)

(73) Assignee: Takaoka Electric Mfg. Co., Ltd., Tokyo (JP)

(*) Notice: Subject to any disclaimer, the term of this patent is extended or adjusted under 35 U.S.C. 154(b) by 0 days.

(21) Appl. No.: 09/461,028

(22) Filed: Dec. 15, 1999

(30) Foreign Application Priority Data

Mar. 23, 1999 (JP) .......................... 11-078061

(51) Int. Cl.⁷ .................................. H01J 3/14

(52) U.S. Cl. ........................ 250/234; 359/397

(58) Field of Search ................ 250/205, 201.1, 250/234, 235; 359/397, 619

(56) References Cited

U.S. PATENT DOCUMENTS 5,239,178 A * 8/1993 Derndinger et al. ........ 250/234
6,252,717 B1 * 6/2001 Grosskopf ................. 359/619

* cited by examiner

Primary Examiner—Seungsook Ham
Assistant Examiner—Seung C. Sohn
(74) Attorney, Agent, or Firm—Kanesaka & Takeuchi

(57) ABSTRACT

An active confocal image acquisition apparatus includes a confocal image acquisition system and a liquid crystal panel. The liquid crystal panel is disposed in the confocal image acquisition system so that its elements are aligned with elements of the detector. The light transmittance of elements of the liquid crystal panel is adjusted so as to make the intensities of reflection of all pixels (the values attained when the parts reflecting light are at or near the focused position) as close to a predetermined level as possible. By this configuration and method of using it, the active confocal image acquisition apparatus can perform accurate measurement if there are high-reflectance and low-reflectance parts together in the measuring field.

13 Claims, 14 Drawing Sheets

Axis-response curve of a confocal peak

Measurable Area

Nonmeasurable area

ACTIVE CONFOCAL IMAGE ACQUISITION APPARATUS AND METHOD OF THREE-DIMENSIONAL MEASUREMENT USING SAME

BACKGROUND OF THE INVENTION

1. Field of the Invention

The present invention relates to an optical apparatus for capturing confocal images and a method of three-dimensional measurement using the apparatus.

2. Discussion of the Background

By utilizing a confocal optical system, the position (hereinafter referred to as the height) of the object measured in the direction of the optical axis (hereinafter referred to as the z-axis direction) can be measured accurately. Before description of the prior art, the principle of measurement of the height by a confocal optical system is explained. A basic configuration of the confocal optical system is shown in FIG. 10. Illumination emitted from the point light source 101 passes through the half-mirror 102 and is refracted by the objective lens 103 to converge on the object. The light that is reflected by the object and enters the objective lens 103 again is converged by the objective lens 103 and then diverted by the half-mirror 102 toward the pinhole 104 disposed at the same position optically as the point light source 101. The amount of light that passes through the pinhole 104 is detected by the photodetector 105. This is the basic configuration of the confocal optical system. By using this optical system, the height of a point on the surface of the object can be measured in the following manner. When a point on the surface on which light for illumination is shone is at the position conjugate to the point light source 101, the light reflected from the point focuses on the position of the pinhole 104, another conjugate position. Therefore, a large amount of light passes through the pinhole 104. The amount of light passing through the pinhole 104 sharply decreases with the distance from the position conjugate to the point light source to the point on the surface. This makes it possible to calculate the height of the point by moving the object with respect to the object lens 103 (hereinafter referred to as Z scan) and finding the position where the output of the photodetector 105 becomes greatest. This is the principle of measurement of height by a confocal optical system.

Since a confocal optical system of the above basic configuration can measure only one point on the surface of the object, scanning in the X and Y directions is required for three-dimensional measurement. However, a primitive method of three-dimensional measurement whereby the object is moved in the X and Y directions in a systematic pattern with respect to the objective lens at each height of stepwise scanning in the Z direction takes a very long time. Therefore, another method that executes Z scanning stepwise and performs X-Y scanning quickly by means of a laser beam or a rotating disk called a Nipkow disk while stopping Z scanning (keeping the distance between the object and objective lens fixed) at each of consecutive heights is commonly used. More specifically, this method performs image acquisition by repeating the steps of capturing a confocal image and moving the object to the next position in the Z direction. For every pixel position it finds the confocal image (Z position) in which the intensity of the pixel at that pixel position is greatest by comparing the intensities of the pixels at that pixel position for all the confocal images acquired. Finally, it calculates the three-dimensional shape of the object.

The confocal image acquisition system is most important for this measurement. Therefore, the confocal image acquisition system is described below as the prior art. There are two types of confocal image acquisition systems: the X-Y scanning type such as the laser scanning type, Nipkow disk scanning type, and table scanning type and the nonscanning type having a plurality of confocal optical systems arrayed in parallel in the X and Y directions. According to the number of illumination spots projected onto the surface of the object, the confocal image acquisition systems can be divided into two types: single spot and multispot (multibeam). The former includes the laser scanning type and the table scanning type, and the latter, the Nipkow disk scanning type and the nonscanning type. Since the present invention relates to the latter multibeam type, the principle of this type of confocal image acquisition system is described below.

FIG. 11(a) shows the configuration of the Nipkow disk scanning confocal image acquisition system. FIG. 11(b) shows the pinholes of a Nipkow disk. The Nipkow disk 111 is disposed at a focal plane (image-forming plane) of the objective lens 8 consisting of lenses 8a and 8b and a diaphragm 9. The Nipkow disk 111 is rotated by the motor 112. The Nipkow disk 111 has pinholes arranged in a spiral. The images of the pinholes are moved over the surface of the object in a raster pattern by one rotation of the Nipkow disk 111. The Nipkow disk 111 was originally invented for raster scanning for television.

The Nipkow disk 111 is illuminated from above by the illuminating arrangement consisting of the light source 1, pinhole 2, and collimator lens 4. Illumination that passes through the pinholes of the Nipkow disk 111 is refracted by the objective lens 8 and forms the images of the pinholes (illumination spots) on the surface of the object A. The light that is reflected from each spot and passes through the objective lens 8 is refracted to converge on the corresponding pinhole. The amount of reflected light that passes through the pinhole is greatest when the surface reflecting the light is at the position conjugate to the pinhole and decreases abruptly with the distance from the conjugate position to the surface. This produces the effect of a confocal optical system. The light that passes through the pinholes is diverted by the beam splitter 113, passes through the image re-forming lens 114, and forms an image of the pinholes on the detector array 11. By rotating the Nipkow disk 111, the light reflected from the illumination spots, which sweep the surface of the object in a raster pattern, moves over the whole detector array 111 and thereby a confocal image is obtained. This confocal image acquisition system using a Nipkow disk is herein called prior art A.

Next, the nonscanning confocal image acquisition system is described below. The nonscanning confocal image acquisition system is not so common, but it is disclosed in Japanese patent application laid-open 265918/1992, 181023/1995, and 257440/1997 and described in a paper written by H. J. Tiziani, et al., "Three-Dimensional Analysis by a Microlens-Array Confocal Arrangement", Applied Optics, Vol. 33, No. 4, pp. 567–572 (1994). The apparatus disclosed in Japanese patent application laid-open 265918/1992 and the one disclosed in Japanese patent application laid-open 257440/1997, which was invented by the same inventor as the present invention, are described below as examples of the nonscanning confocal image acquisition system.

First, the apparatus disclosed in Japanese patent application laid-open 265918/1992 is described with reference to FIG. 12. Illumination emitted from the light source 1 is refracted by the collimator lens 4 into parallel-ray light and shone over the pinhole array 7. The pinhole array 7 consists of a plurality of pinholes arranged on the same plane. Each pinhole of the pinhole array 7 performs the same function as a point light source, and the pinhole array 7 is equivalent to arrayed point light sources. The light passing through the pinholes of the pinhole array 7 passes through the half-mirror 121. The light is then converged by the objective lens 8 consisting of lenses 8a and 8b and a telecentric diaphragm 9 and shone on the object A in small spots. The light that is reflected from each spot on the object A enters the objective lens 8 converges on the corresponding pinhole of the pinhole array 7. The light is then diverted by the half-mirror 121 away from the pinhole array 7 to the detector pinhole array 10 aligned with the pinhole array 7 so that its pinholes are at the same position optically as the corresponding pinholes of pinhole array 7. The light that passes through pinholes of the pinhole array 10 is detected by the detector array 11 whose element detectors are disposed right behind the corresponding pinholes. The above described configuration is equivalent to a plurality of confocal optical systems disposed in parallel. Although the detector pinhole array 10 is made dispensable by using a CCD sensor with a low aperture ratio (the ratio of its sensor element to the pixel area) as shown in the publication, the more common configuration described above is herein referred to as prior art B.

Next, the apparatus disclosed in Japanese patent application laid-open 257440/1997 is described with reference to FIG. 13. Illumination generated by the light source 1 is emitted through the pinhole 2 functioning as a point light source. The light emitted from the pinhole 2 is refracted by the collimator lens 4 into parallel-ray light. The optical path branching optical element 131 is a polarizing beam splitter which linearly polarizes the illumination light passing through it. The illumination passing through the optical path branching optical element 131 is shone over the microlens array 132 and converged by individual lenses to their focal points. The pinhole array 7 is disposed in the focal plane of the microlens array 132 and is aligned with the microlens array 132 so that each pinhole is coaxial with and positioned at the focal point of the corresponding microlens of the microlens array 132. Therefore, the illumination that enters each microlens converges on the pinhole under it and passes through the pinhole. The light that passes through each pinhole of the pinhole array 7 enters the objective lens 8; the light is converged by the objective lens 8 and circularly polarized by the ¼-wavelength phase shifting plate 133 placed in the objective lens 8. Thus an image of the pinhole array 7 is formed on the object A. The objective lens 8 is a bidirectional telecentric lens consisting of lenses 8a and 8b and a telecentric diaphragm 9 constructed so that the magnification (ratio of the size of the image of the object A or pinhole array 7 to the object A or pinhole array 7) does not change if the object A or pinhole array 7 is moved along the optical axis.

The light that is reflected from each illumination spot on the object A and enters the objective lens 8 is polarized again by the ¼-wavelength phase shifting plate 133 into linearly-polarized light at right angles with the illuminating light and converges on the corresponding pinhole of the pinhole array 7. The reflected light that passes through each pinhole of the pinhole array 7 is refracted by the corresponding microlens of the microlens array 132 to become parallel-ray light. The light then enters the optical path branching optical element 131 and is diverted to a image re-forming optic system 134 because of its polarization perpendicular to the illuminating light. The diverted light enters the image reforming optic system 134 and converges to form an image of the microlens array 132 on the detector array 11. The image formed on the detector array 11 is a confocal image and converted into electrical signals. This apparatus is referred to as prior art C.

The major difference between prior art C and prior art B is that prior art C has only one pinhole array serving both as the illuminating pinhole array and the detecting pinhole array instead of separate two pinhole arrays. From this point of view, the apparatus disclosed in patent application 181023/1995 and that described in the paper of H. J. Tiziani, et al., "Three-Dimensional Analysis by a Microlens-Array Confocal Arrangement", Applied Optics, Vol. 33, No. 4, pp. 567–572 (1994) may be included in prior art C.

Detecting a plurality of points simultaneously by using a two-dimensional detector is common in the prior art described above. However, there is a problem with three-dimensional measurement by these confocal image acquisition systems; if there are high- and low-reflectance regions or regular- and scatter-reflection regions together in the measuring field, it is difficult to measure both regions at the same time.

In three-dimensional measurement by a confocal optical system, the peak of the intensity of reflected light must be sought. If the peak intensity is greater than the saturation intensity of the detector, the peak intensity cannot be known. If the peak intensity is smaller than the noise, it also cannot be known.

If the brightness of the measuring field of measurement is uniform, the intensity of reflected light can be adjusted so the peak intensity does not exceed the saturation intensity of the detector and is sufficiently greater than the noise by appropriately determining the intensity of the illumination or the shutter speed (exposure). When there are regions of considerably different reflection intensities in the measuring field as described above, the peak intensities of the light reflected from high-reflectance parts exceed the saturation intensity of the detector if the intensity of the illumination or the shutter speed is determined so that the peak intensities of the light reflected from low-reflectance area are sufficiently greater than the noise, or the peak intensities of the light reflected from low-reflectance area become smaller than the noise if the intensity of the illumination or the shutter speed is determined so that the peak intensities of the light reflected from high-reflectance parts do not exceed the saturation intensity of the detector.

The ratio of a high reflection intensity to a low reflection intensity can be the fifth power of 10 or greater in an extreme case. On the other hand, the dynamic range of a CCD, a commonly used two-dimensional detector, is at most the third power of 10. Therefore, the above described problem can inevitably occur.

Coexistence of area with a very large difference between their intensities of reflection in a measuring field can cause not only the problem of the dynamic range but also another problem. Since a multispot confocal optical system shines a plurality of illumination spots onto the object, the output of the detector indicating the intensity of reflection from an illuminating spot can be affected by light reflected from other spots. This is because a beam that is reflected from a surface not at the focused position converges off the corresponding pinhole as the beam 3 in FIG. 14 and part of the beam enters adjacent pinholes.

When the reflectances of adjacent area of the surface are nearly equal, no problem occurs if unfocused light reflected from one part enters the pinhole corresponding to the other part, because the intensity of the light from the one part is far smaller than the intensity of reflection from the other part when the other part is at the focused position.

However, if there is a great difference between the reflectances of the points of the surface illuminated by adjacent spots, a problem occurs. That is, if unfocused light reflected from the high reflectance point enters the pinhole corresponding to the low reflectance point, the intensity of the light from the high reflectance point is greater than the intensity of the light from the low reflectance point even when the point is at the focused position. Therefore, the output of the detector indicating the intensity of reflection from the low reflectance point attains a peak at a position other than the focused position of the point, causing an incorrect measurement.

There are other problems to be solved with confocal image acquisition systems, not only a multibeam confocal image acquisition system. One of the problems is unevenness caused by various factors of the optical system. If a high-precision mirror without flaw and dirt is measured by a multibeam confocal image acquisition system, for example, the outputs of all elements of the detector must be equal when the mirror is placed at the focused position for each illumination spot (the focused position at which the object is brought into focus is slightly different for each spot because of the distortion of the objective lens's image plane) but not equal in practice.

This problem can be caused by the nonuniformity in illumination when a laser is used for the illuminating light source. Since a laser beam has usually an intensity distribution of a Gaussian distribution, the intensities of illumination at the central part (central part of image) and peripheral part (peripheral parts of image) of the beam are different when simply expanding the laser beam to illuminate the pinhole array.

Another cause is the difference in the size of the pinholes. There may be chips and burs in the edges of pinholes occurring in the manufacturing process. Further, in a system having a microlens array as prior art C, the manufacturing quality of the microlens array has an effect on the unevenness. The sensitivities of the elements of the detector are not the same. Manufacturing errors in the objective lens and differences in the image angles of light rays can cause nonuniformity.

Accordingly, an object of the present invention is to solve the problems described above.

SUMMARY OF THE INVENTION

To attain this object, the present invention adds to a confocal image acquisition system a light intensity control means for adjusting the illumination light intensity by spots or slits corresponding to each element of the detector for performing simultaneous parallel confocal detection.

Instead of a light intensity control means for adjusting the illumination intensity, a light intensity control means for adjusting the intensity of light entering each element of the detector may be added to a confocal image acquisition system.

It is preferable to use a light intensity control portion of a liquid crystal panel (hereinafter referred to as a liquid crystal panel) for the light intensity control means.

By adjusting the intensity of illumination or the intensity of light entering the detector in pixels so that the peak of the intensity of reflected light for each pixel does not exceed the saturation intensity of the detector and is sufficiently greater than the noise, it becomes possible to accurately measure even an object having both high reflectance and low reflectance area. The nonuniformity of the optical system can also be corrected at the same time.

Further, the measurable range of intensity of reflection is substantially increased without using a detector having a wide dynamic range and increasing the number of bits for measurement for the wider dynamic range. Therefore, the computational quantity does not increase.

It is further preferable that the confocal image acquisition system of the present invention be provided with a focused position shifting means for bringing different parts of the object into focus in order along the optical axis and a processing and control means for processing the images obtained and adjusting the light intensity control means.

Confocal image acquisition systems having the novel configuration described above are designated as active confocal image acquisition apparatus.

By thus configuring a system, a confocal image acquisition system can be used as a general-purpose three-dimensional measuring system, and even more accurate measurement is made possible by the following methods.

A method of measuring the three-dimensional shape of an object using the active multibeam confocal image acquisition apparatus comprises the following steps:

setting the intensity of light entering all elements of the detector to a low intensity;

capturing a plurality of confocal images bringing different parts of the object into focus by the focused position shifting means;

composing an extended focus image by collecting for all image pixels the greatest value among the values of pixels at the same pixel position of the confocal images obtained;

computing the adjustment information for adjusting the elements of the light intensity control means so as to make the intensities of light entering all elements of the detector as close to a predetermined level as possible using the values of the pixels of the extended focus image;

adjusting the elements of said light intensity control means according to the adjustment information; and performing three-dimensional measurement by capturing a plurality of confocal images bringing different parts of the object into focus by the focused position shifting means.

The extended focus image may also be produced by computing the true peak value for each pixel from the confocal images obtained by the second step of the above method by interpolation.

Another method comprises the following steps:

setting the intensity of light entering all elements of the detector to a high intensity;

capturing a blurred confocal image at a Z position at which all pixels are evidently out of focus;

determining the adjustment information for adjusting the elements of the light intensity control means so as to make the intensities of light entering all elements of the detector as close to each other as possible using the values of the pixels of the blurred confocal image;

adjusting the elements of the light intensity control means according to the adjustment information; and performing three-dimensional measurement by capturing a plurality of confocal images bringing different parts of the object into focus by the focused-position shifting means. Other objects, features and advantages of the invention will hereinafter become more readily apparent from the following description.

DETAILED DESCRIPTION OF THE INVENTION AND PREFERRED EMBODIMENTS

Figure 1:
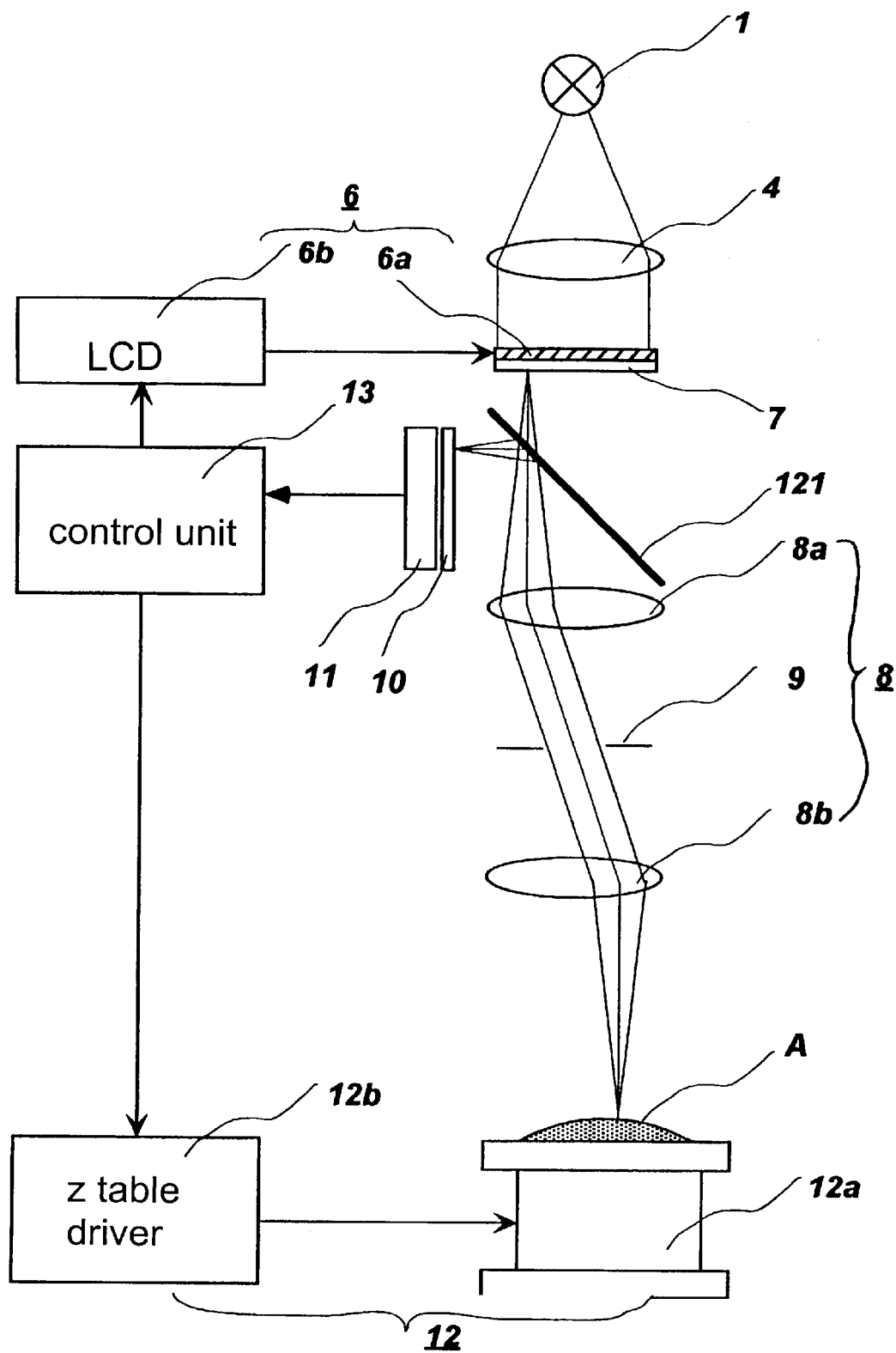
FIG. 1 shows a first embodiment of the active confocal image acquisition apparatus of the present invention.

Preferred embodiments of the present invention are described below with reference to the drawings. FIG. 1 shows the first embodiment of the present invention. The basic configuration of the active confocal optical system of this embodiment is the same as that of prior art B. Only the difference is explained below to avoid repetition. The difference is that the light intensity control means 6 is disposed above the pinhole array 7 as shown in FIG. 1. The light intensity control means 6 consists of the LCD (Liquid crystal panel) 6a and the LCD driver 6b. The LCD 6a is aligned with the pinhole array 7 so that each pixel is positioned right above the corresponding pinhole of the pinhole array 7. The LCD driver 6b may be built in the LCD 6a or separately housed.

In the system shown in FIG. 1, the processing and control unit 13 captures confocal images through the detector array 11, moving the object with respect to the optical system by means of the Z scanning means 12 consisting of the Z table 12a and the Z table driver 12b.

Figure 2:
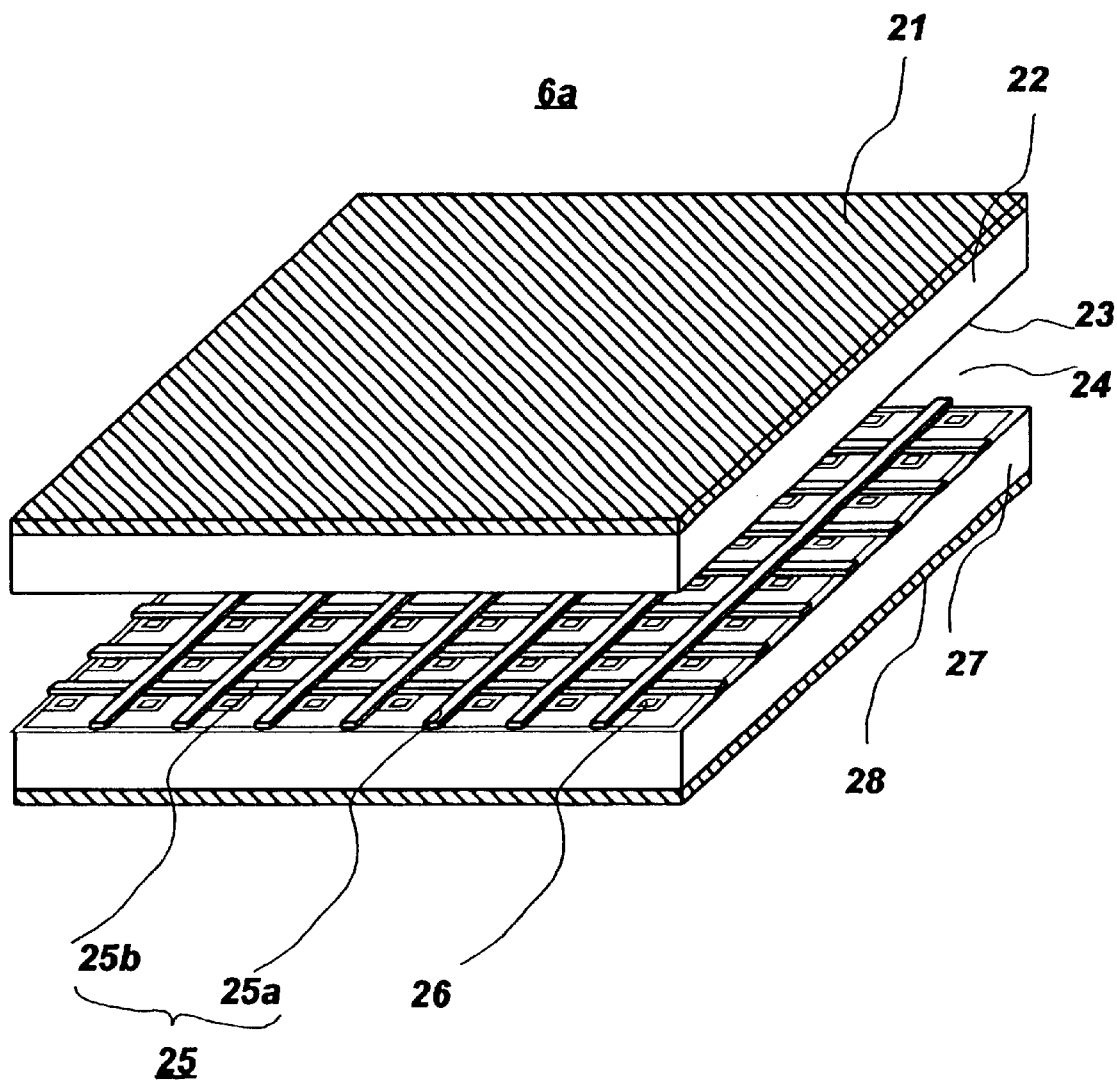
FIG. 2 shows the construction of a TFT active matrix TN liquid crystal panel used for the light intensity control means of the present invention.

First, the construction and function of the light intensity control means 6 is described below. The construction of the LCD 6a of the light intensity control means 6 is shown in FIG. 2. The LCD 6a of this embodiment is an active matrix display using thin film transistors (called TFT). A TFT active matrix display consists of a polarizing plate 21, glass substrate 22, transparent electrode 23, liquid crystal 24, X and Y transparent matrix electrodes 25, TFT 26, glass substrate 27, and polarizing plate 28. This TFT active matrix display operates as follows. When a voltage is applied to an X electrode 25a, the corresponding TFT 26 is turned on. If a control voltage is applied to a Y electrode 25b simultaneously, the capacitor formed at the intersection of the X and Y electrodes is charged by the electric current flowing through the TFT 26. As a result, an electric field is applied to the liquid crystal 24 of the pixel at the intersection. After the capacitor is charged, the TFT 26 is turned off and the charge remains there until the pixel is next selected. That is, the control voltage is kept applied to the liquid crystal 24 of the pixel until the pixel is next selected and the capacitor is charged to a new voltage. By thus applying signal voltages to all pixels one by one (referred to as scan), any desired voltages can be applied to individual pixels separately.

Figure 3A:
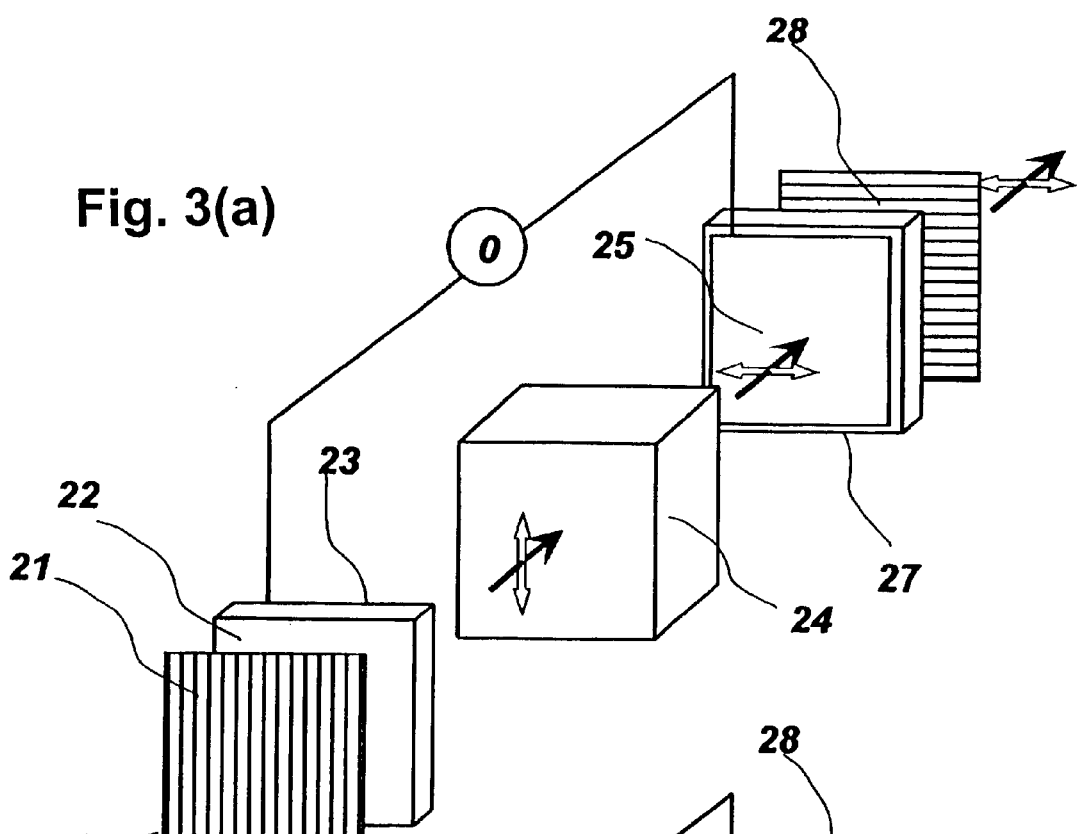
FIG. 3 shows the operation of the pixels of the liquid crystal panel used for the present invention.
Figure 3B:
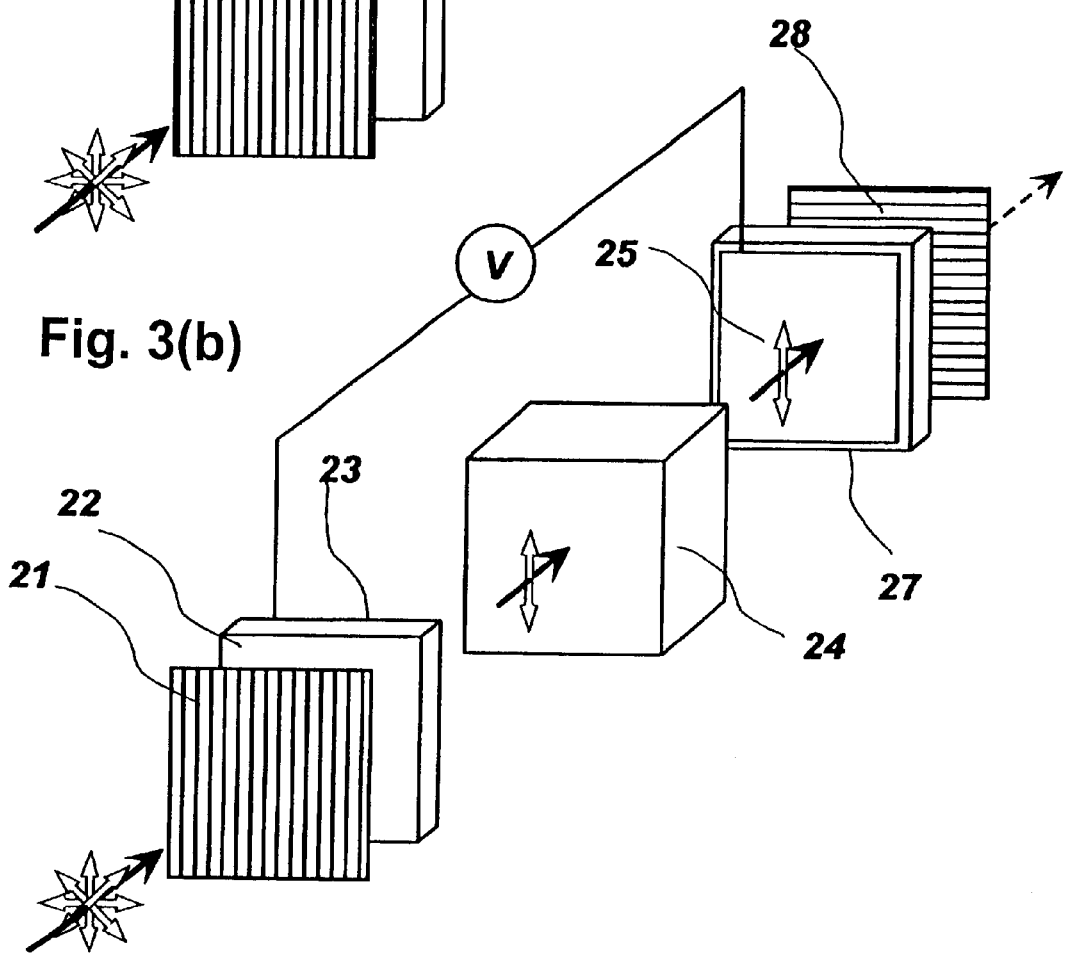

The function of each pixel of the LCD 6a is explained with reference to FIG. 3. Light that passes through the polarizing plate 21 is linearly polarized. The linearly polarized light then enters the liquid crystal. The liquid crystal used is a twist nematic liquid crystal (hereinafter referred to as TN liquid crystal). The degree of twist of the liquid crystal 24 varies according to the electric field between the opposite transparent electrodes 23 and 25. The light passing through the liquid crystal 24 is optically rotated in proportion to the degree of twist of the liquid crystal 24 (the plane of polarization of linearly polarized light is rotated). The polarizing plate 28 and the polarizing plate 21 are disposed so as to be crossed Nicols. When no electrical field is applied to the liquid crystal 24, linearly polarized light that enters the pixel through the polarizing plate 21 is optically rotated 90° and passes through the polarizing plate 28. The amount of light that passes through the polarizing plate 28 can be controlled by changing the voltage between the transparent electrodes 23 and 25.

By using the function of the LCD 6a, the amount of light that passes through the LCD 6a can be controlled by pixels, that is, the light intensity control means 6 for the present invention is realized by the LCD 6a. Since each pixel of the LCD 6a is disposed right above the corresponding pinhole of the pinhole array 7, the intensity of light passing through each pinhole of the pinhole array 7 can be adjusted respectively by the pinholes.

The LCD 6a is driven by the LCD driver 6b. Two-dimensional light intensity control data (data that represents the voltages for individual pixels of the LCD 6a) is sent from the processing and control unit 13 to the LCD driver 6b. The LCD driver 6b produces control voltages from the data and applies these voltages to the pixels of the LCD 6a.

Figure 4:
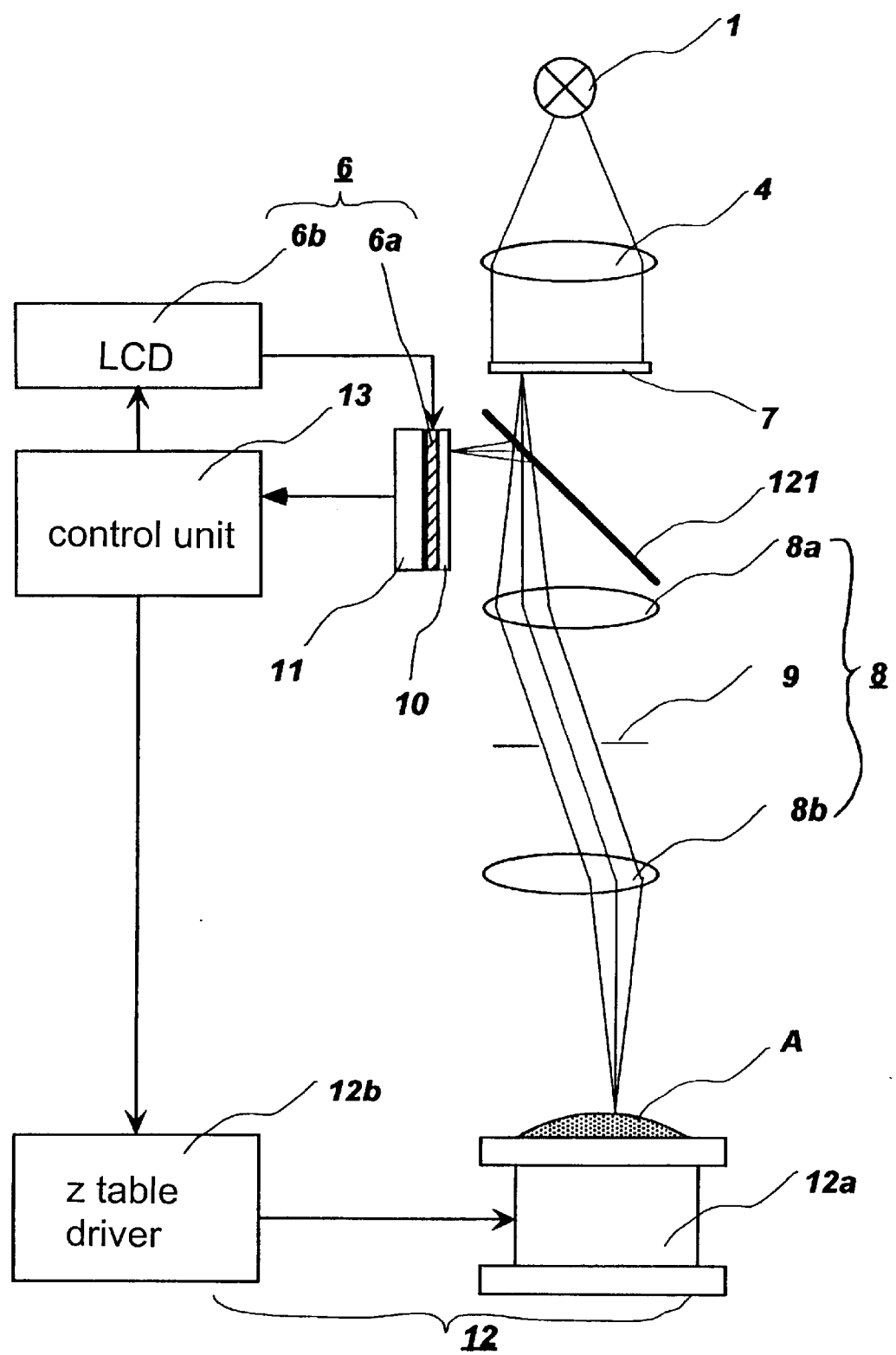
FIG. 4 shows a second embodiment of the active confocal image acquisition apparatus of the present invention.

The second embodiment of the present invention is shown in FIG. 4. This embodiment is the same as the first embodiment except that the LCD 6a is attached to the detecting pinhole array 10. Although the first embodiment is the better for reducing stray light, fundamentally the same effect can be obtained by both embodiments.

Figure 5:
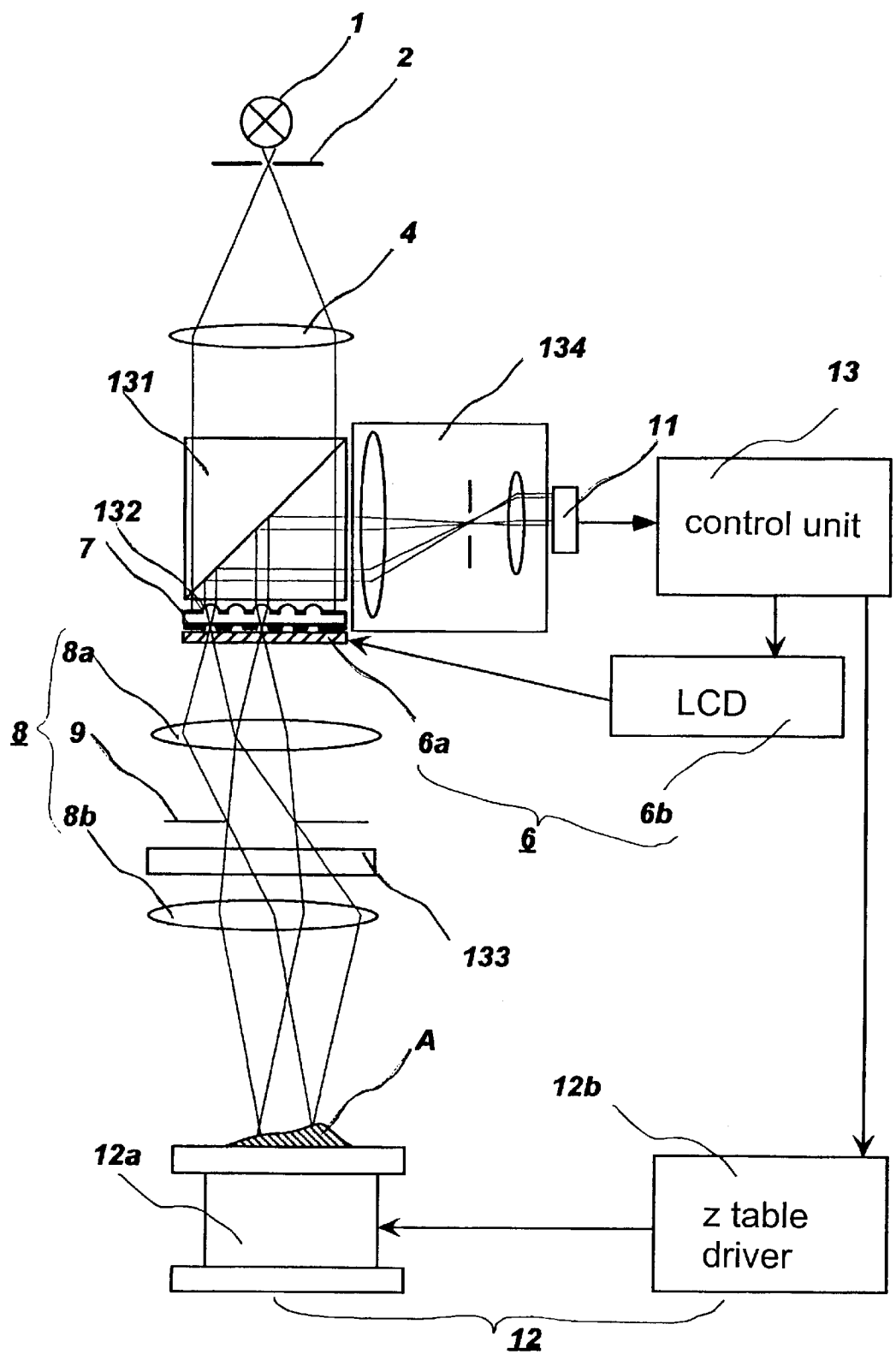
FIG. 5 shows a third embodiment of the active confocal image acquisition apparatus of the present invention.

The third embodiment of the present invention is shown in FIG. 5. This embodiment has the configuration of prior art C with the light intensity control means 6 added. Since it has only one pinhole array serving both as the illuminating and detecting pinhole arrays, attaching a light intensity control means to the pinhole array is equivalent to attaching a light intensity control means to both the illuminating and detecting pinhole arrays of the first and second embodiments. Therefore, the intensity of light that reaches each element of the detector array 11 is in proportion to the square of the transmittance of the corresponding pixel of the light intensity control means 6.

Figure 6:
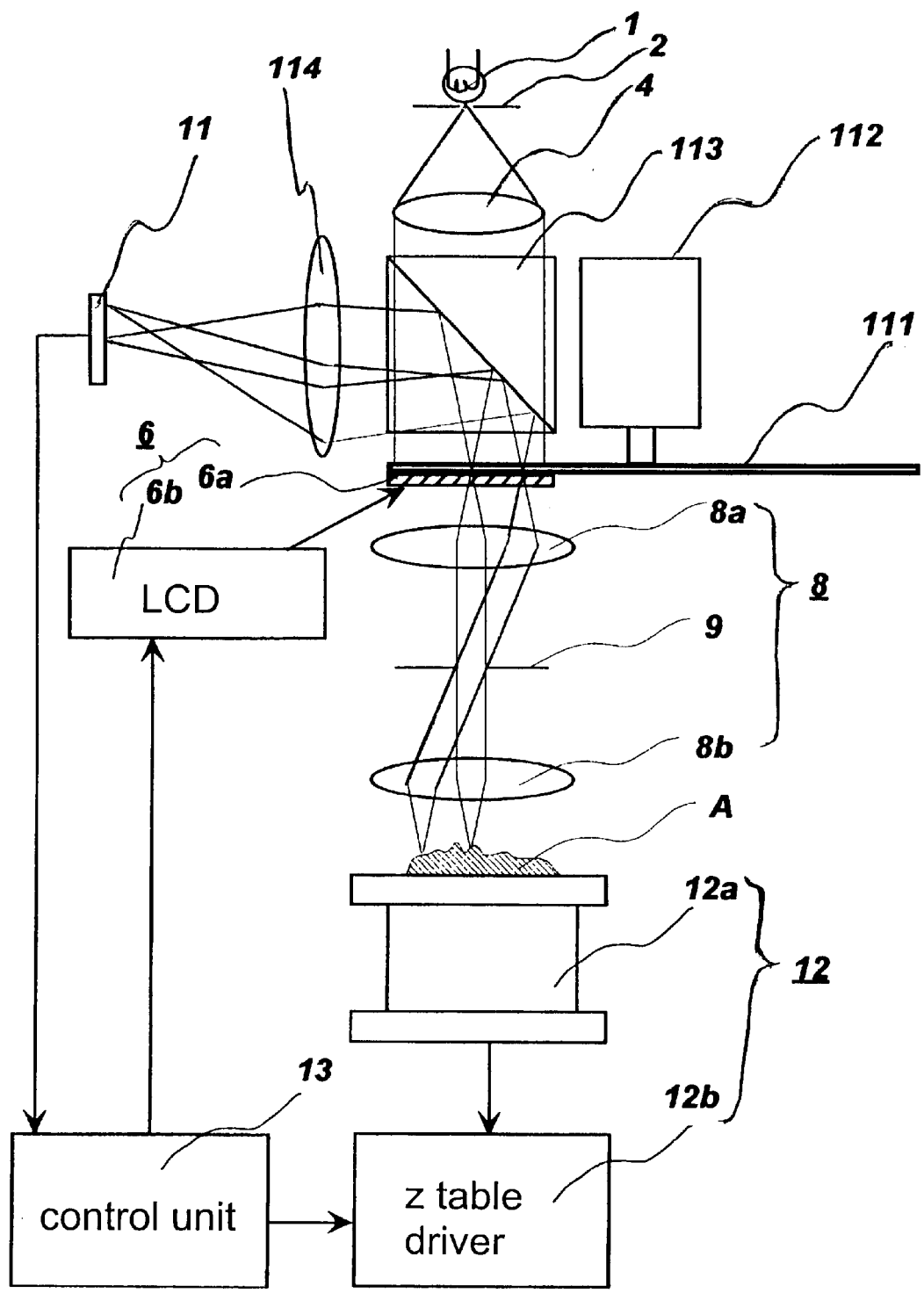
FIG. 6 shows a fourth embodiment of the active confocal image acquisition apparatus of the present invention.

The fourth embodiment of the present invention is shown in FIG. 6. This embodiment has the configuration of prior art A with the light intensity control means 6 added. The intensity of light that reaches each element of the detector array 11 is in proportion to the square of the transmittance of the corresponding pixel of the light intensity control means 6 as in the third embodiment. It is not possible to align pinholes with the pixels of the light intensity control means 6 in an one-to-one correspondence in the configuration of this embodiment. Still, the same effect as in the other embodiments can be obtained if the pixels of the light intensity control means 6 are disposed at the positions optically corresponding to the pixels of the detector array 11. The light intensity control means 6 may also be disposed just in front of the detector array 11.

Although a TFT active matrix TN liquid crystal panel is used for the light intensity control means 6 in the embodiments described above, any other means which can control the intensity of illuminating light beams or reflected light beams of a multibeam confocal image acquisition system separately can be used for the light intensity control means for the present invention.

Next, the method of performing three-dimensional measurement in practice by the apparatuses of the above embodiments is described below. The following description is made with reference to the apparatus of the first example.

The method of three-dimensional measurement by a confocal image acquisition system is already explained in the description of prior art. The present invention obtains the intensity of reflection for each pixel (intensity of reflection for a pixel is the intensity of light reflected from the part of the object corresponding to the pixel when the part is at the focused position, and the information about reflection of an object containing the intensities of reflection for all pixels is hereinafter referred to as the reflection intensity map), and then adjusts the intensity of illumination light or light to the detector by pixels using the reflection intensity map so as to make the intensity map uniform. The purpose of this adjustment is to prevent high intensities of reflection exceeding the saturation intensity of the detector and low intensities below the noise from coexisting in the measuring field. Here occurs a problem of how to obtain the reflection intensity map.

A method of obtaining the reflectance of the object to measure is described below as the fifth embodiment. Image data captured by illuminating the object with light of a uniform illuminance is the reflection intensity map when the object is flat. However, if there are pixels of the image that exceed the saturation light intensity of the detector, a correct reflection intensity map cannot be obtained. To obtain a correct reflection intensity map, the intensity of illuminating light must be low so that no pixel of the image exceeds the saturation light intensity of the detector. The intensity of illuminating light is lowered by adjusting the light intensity control means so as to decrease the intensity of the whole, correcting the lack of uniformity in intensity inherent in the confocal optical system used. The intensity of the illumination can also be lowered using a means for varying the power of the illuminating light source.

Since parts of an image out of focus are dark in a confocal optical system, an image with all pixels in focus must be obtained in order to obtain an accurate reflection intensity map. An entirely focused image of an object having unevenness greater than the depth of focus is called an extended focus image. The method of obtaining an extended focus image is described below.

The method is basically the same as three-dimensional measurement. This method moves the object step by step with reference to the optical system by the Z scanning means and captures a confocal image at each measuring position. Each of the confocal images thus obtained is partly in focus. The method then composes an image the whole part of which is in focus from the focused parts of those confocal images. The method of composition is to collect for each pixel the value of the pixel from the confocal image in which the pixel is in focus. It is very easy to know which of the pixels at the same position of a set of confocal images is in focus, that is, the one having the greatest value is in focus. Therefore, an extended focus image is obtained by collecting the greatest values for all pixels to form an image.

Figure 7:
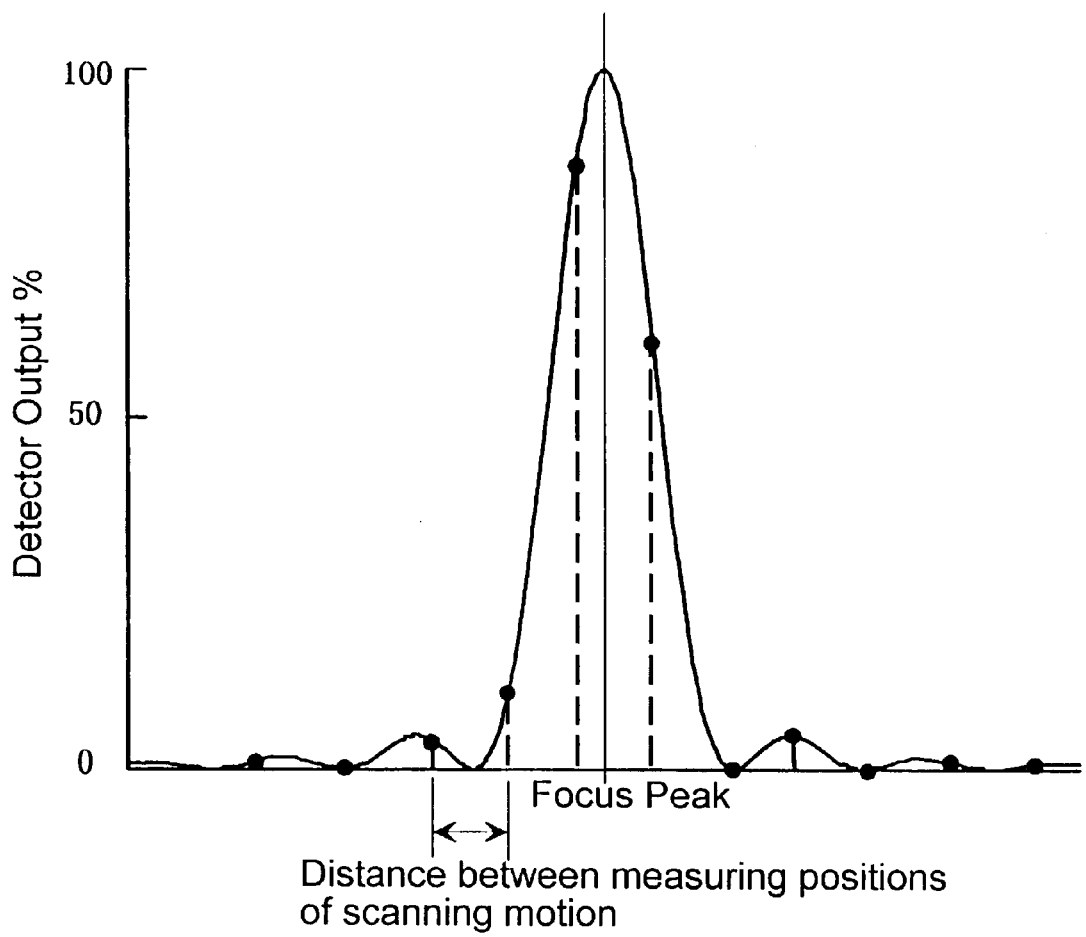
FIG. 7 is a graph that indicates the axial response curve of a confocal optical system.

When the distance between the measuring positions of the scanning motion by the Z scanning means is relatively large, the reflection intensity map with all pixels in focus is obtained by interpolation as follows. The intensities of reflection required for the reflection intensity map is the peak value of the axial response curve of a confocal optical system as shown in FIG. 7. However, if the distance between the measuring positions of the scanning motion by the Z scanning means is relatively large, even the value at the measuring position nearest to the focal position can be considerably different from the peak value as shown by a broken line in FIG. 7. Therefore, interpolation is used to estimate accurate reflection intensity. The interpolation uses three values obtained by measurement: the largest value and the values at the measuring positions adjacent to the measuring position of the largest value on both sides and fits a bell-shaped curve such as a parabola or Gaussian curve to the three values. This interpolation is executed for every pixel to estimate the peak value of the intensity of reflected light.

More than three values may be used for the interpolation, but three values are usually enough because a particularly high accuracy is not required.

Once an extended focus image can be composed from the estimated peak values, it is possible to obtain an accurate reflection intensity map.

Since weak illumination is used to prevent saturation of the detector, the accuracy of low reflection intensities of the reflection intensity map is not high, but still enough for the purpose of providing a rough ratio of the highest to the lowest reflectances of the object in order to determine an appropriate intensity of illumination light for higher-accurate three-dimensional measurement.

After the reflection intensity map has been obtained, the light intensity control means is adjusted using the reflection intensity map so that the intensities of reflection of all pixels become approximately equal. When the intensity of reflection is measured at 256 levels and the value at which the intensities of all pixels are made equal is 200, for example, first the values of all pixels of the reflection intensity map are divided by 200 to normalize, and then the light intensity control means is adjusted so that the transmittance of its pixel corresponding to each pixel of the reflection intensity map is increased or decreased by the reciprocal of the normalized value of the pixel. Although the intensity of reflection from very low reflectance parts of the object cannot be increased to level 200 because a very high-intensity illumination exceeding the maximum output power of the light source is required, it is enough just to set the light intensity control means for maximum intensity for those parts.

By adjusting the intensities of reflection of pixels separately as described above, the apparent dynamic range of the detector is significantly increased. According to a simplified calculation, the number of levels of detection multiplied by the number of levels of transmittance of the light intensity control means becomes the dynamic range of the confocal optical system. If both numbers are 256 (8 bits), the resultant dynamic range increases to 65,536 (16 bits).

Since the computation is still executed in 8 bits, the computational quantity does not increase. Further, the problem of effects of adjacent beams in a multibeam confocal optical system can be solved.

Next, the sixth embodiment is described below. The procedure of obtaining the reflection intensity map of the fifth embodiment is almost the same as that of three-dimensional measurement, differing only in the expression of interpolation used. Therefore, three-dimensional measurement using the method of the fifth embodiment takes in total about twice the time required for conventional three-dimensional measurement. However, there is not always sufficient time to execute the method of the fifth embodiment in three-dimensional measurement used for online measurement. This sixth embodiment explains a faster method of obtaining the reflection intensity map, showing a sample of measurement.

Figure 8:
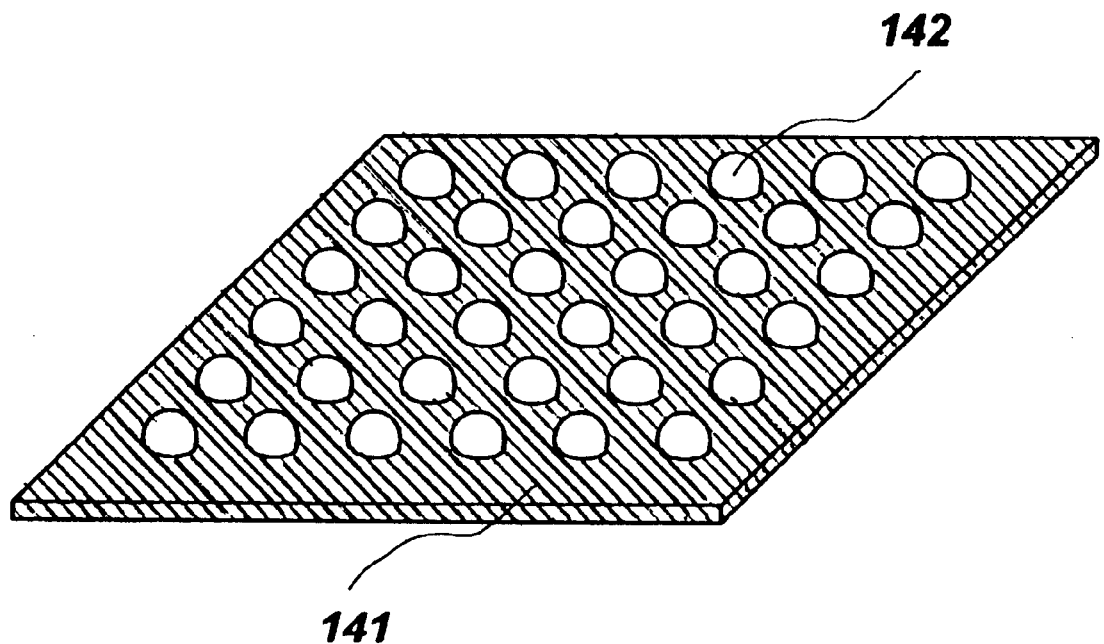
FIG. 8 is a diagrammatic drawing for explaining BGA.
Figure 9:
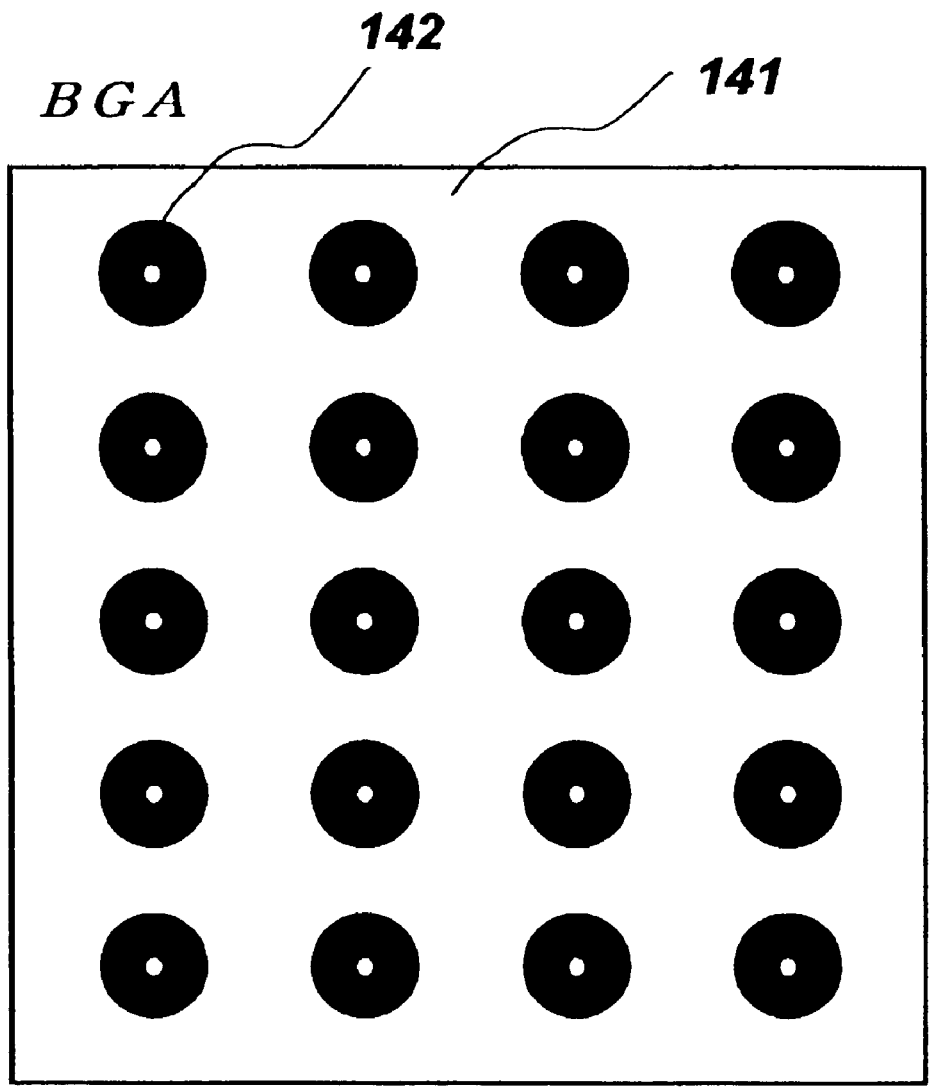
FIG. 9 shows the surface regions of BGA lead conductors that can be measured.
Figure 9:
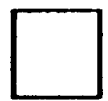
Figure 9:
Figure 10:
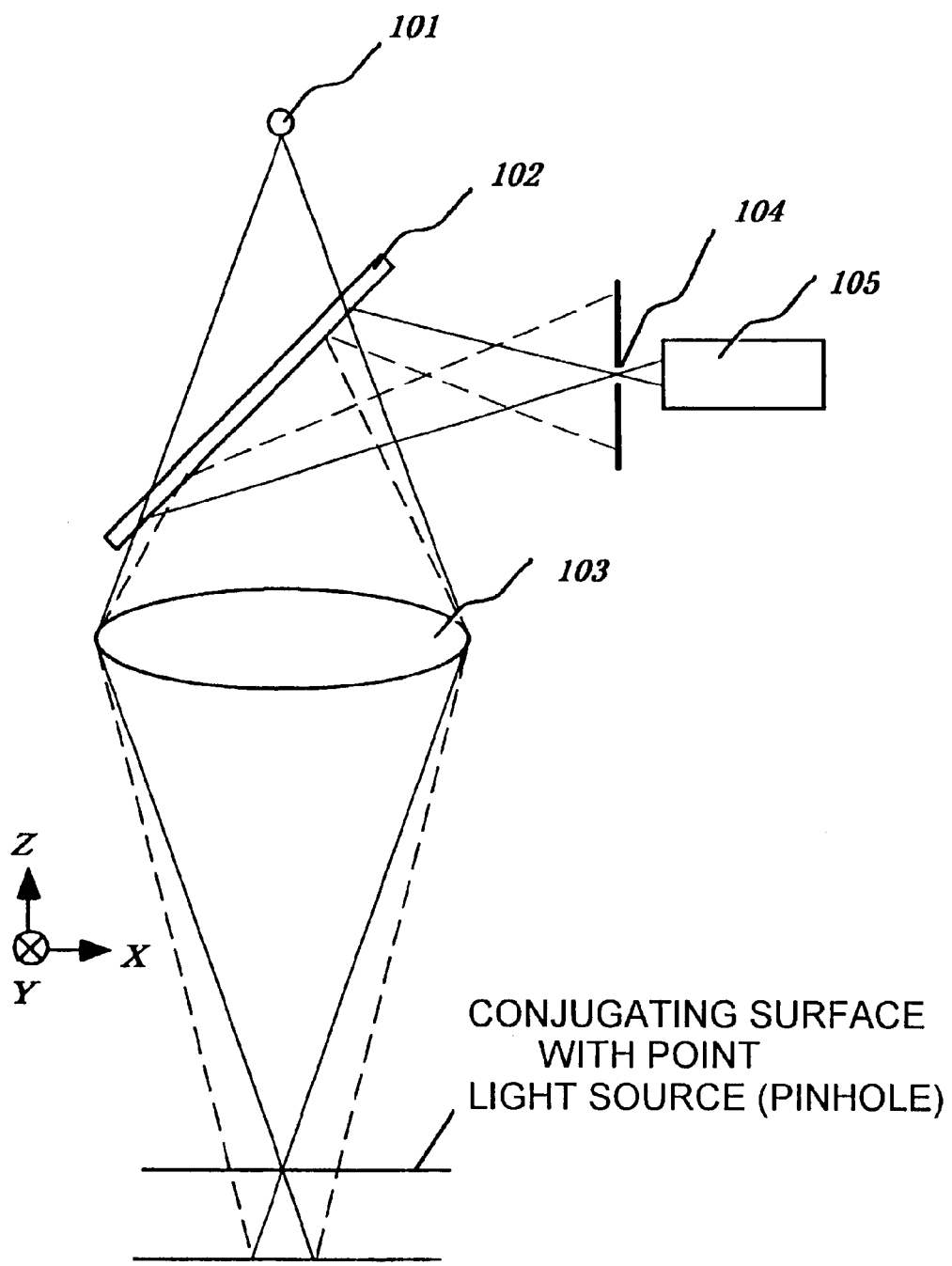
FIG. 10 is a schematic drawing for explaining a confocal optical system.
Figure 11A:
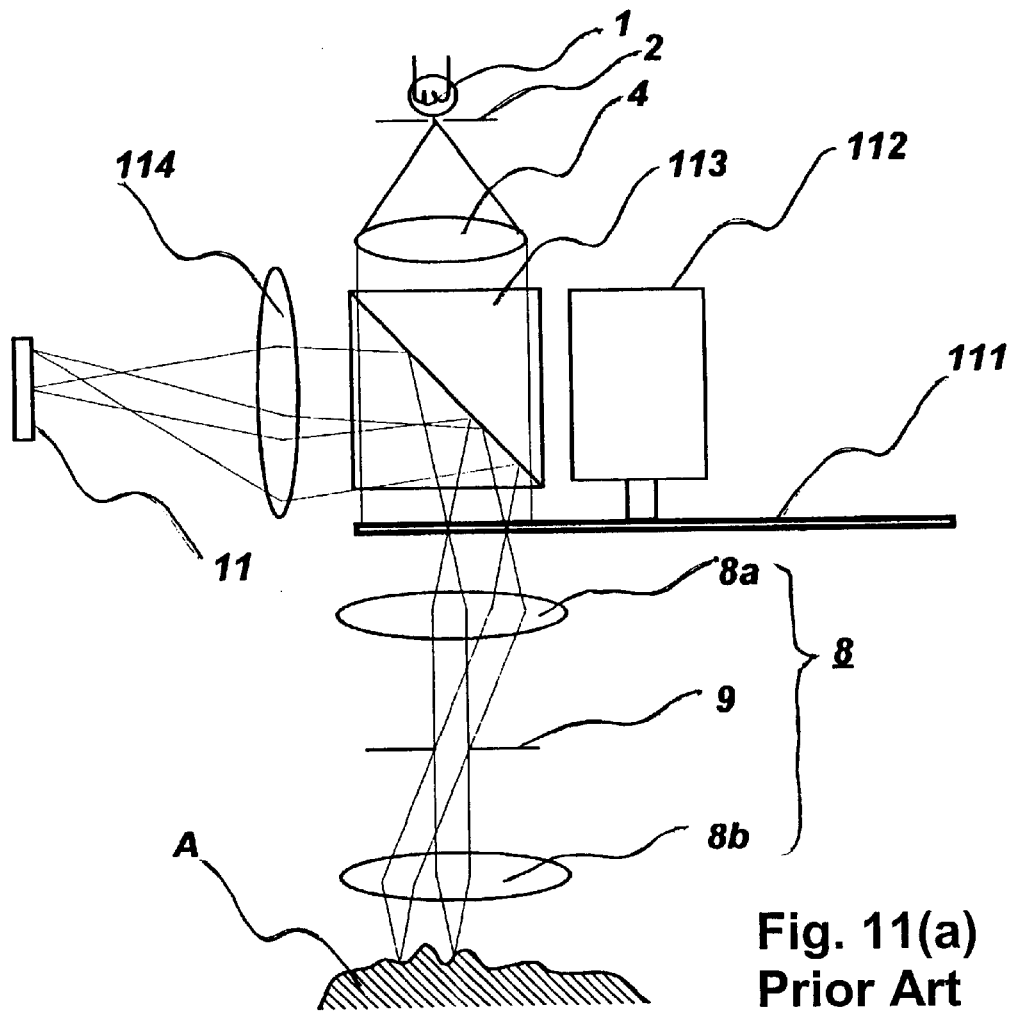
FIG. 11 is a schematic drawing for explaining prior art A.
Figure 11B:
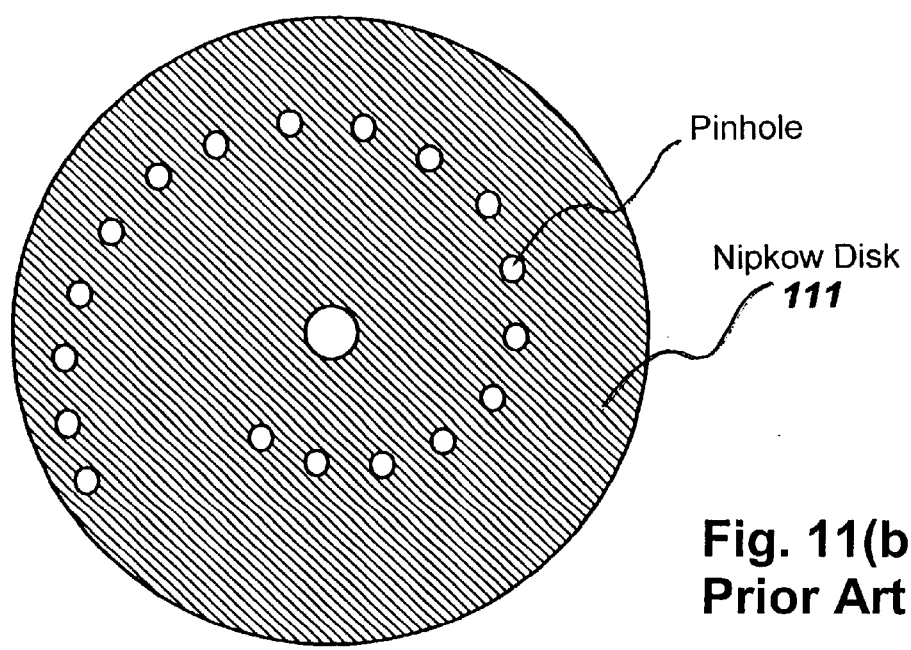
Figure 12:
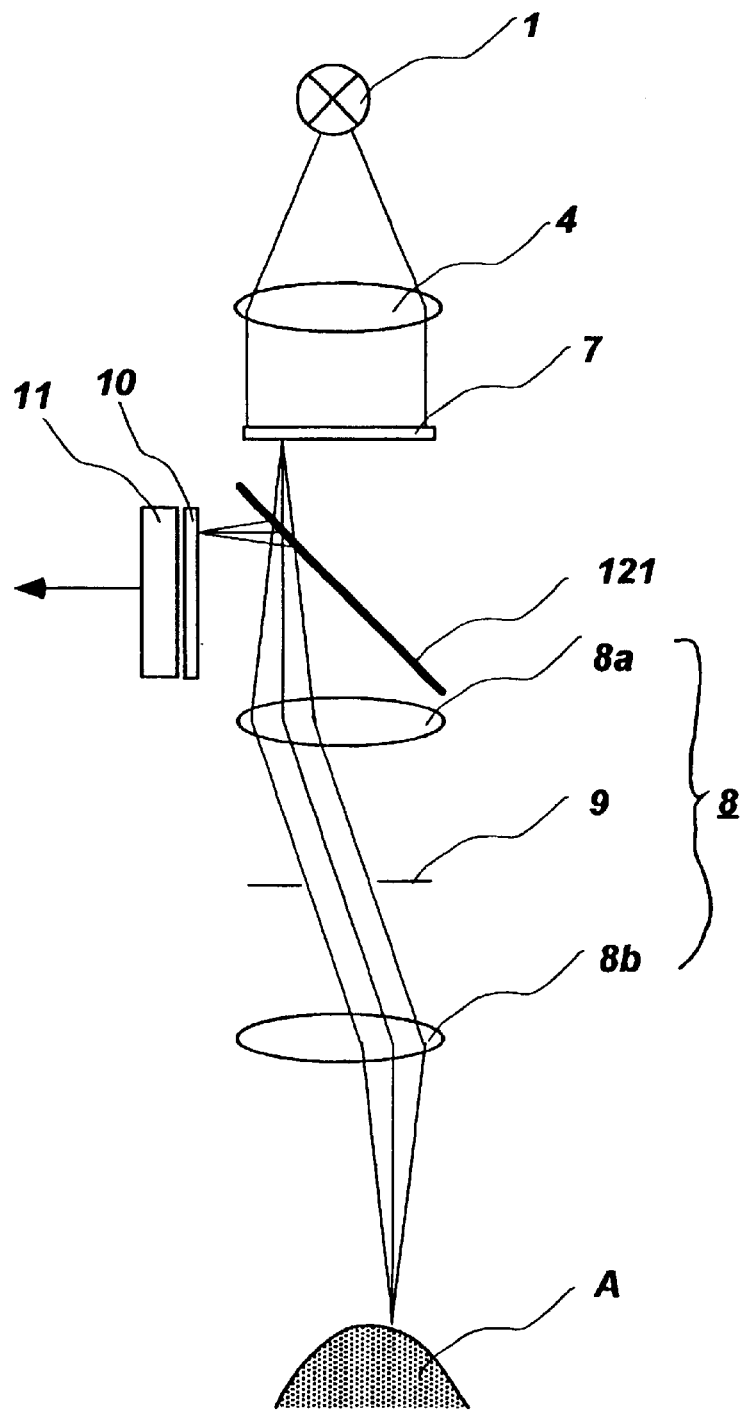
FIG. 12 is a schematic drawing for explaining prior art B.
Figure 13:
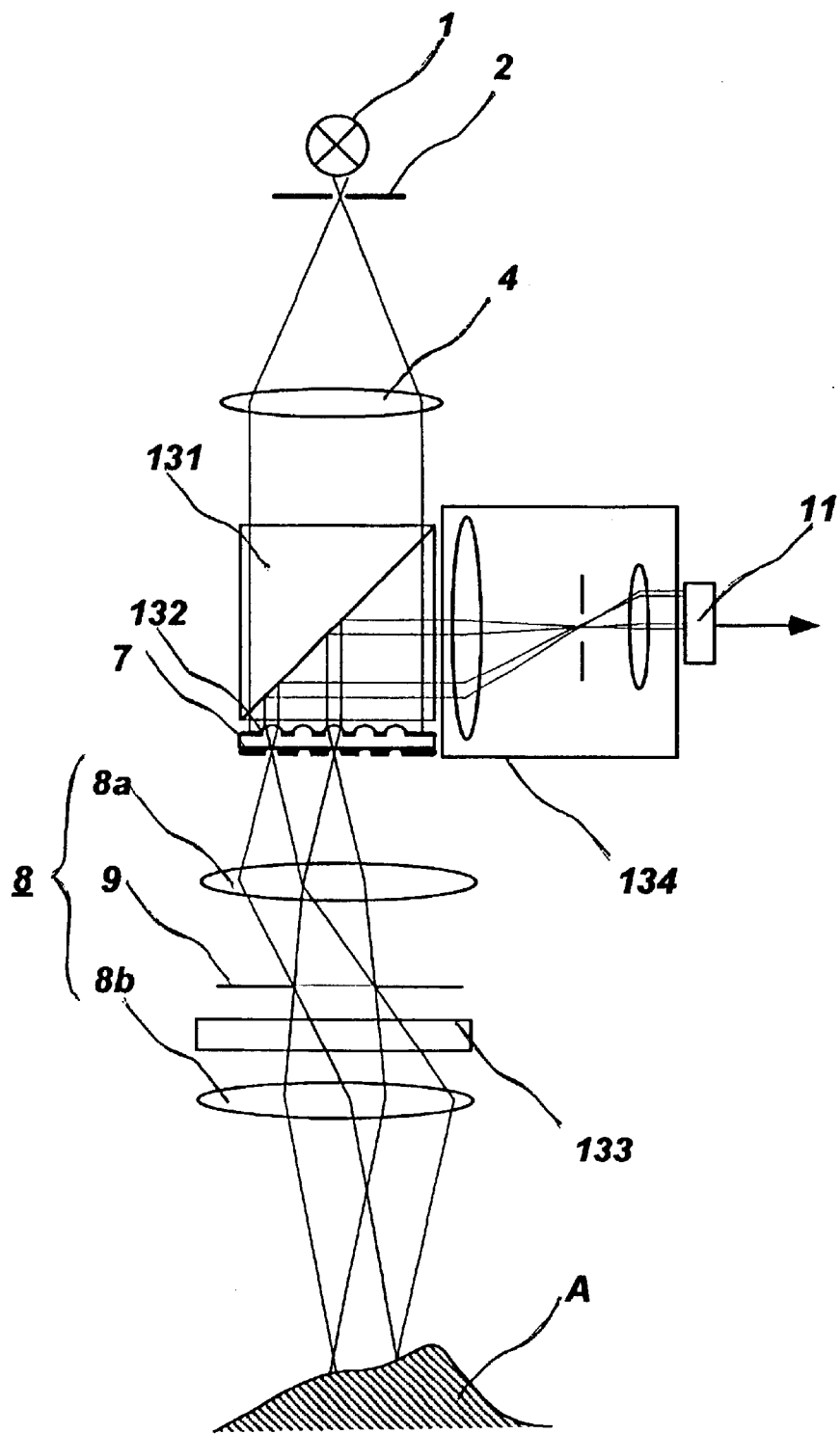
FIG. 13 is a schematic drawing for explaining prior art C.
Figure 14:
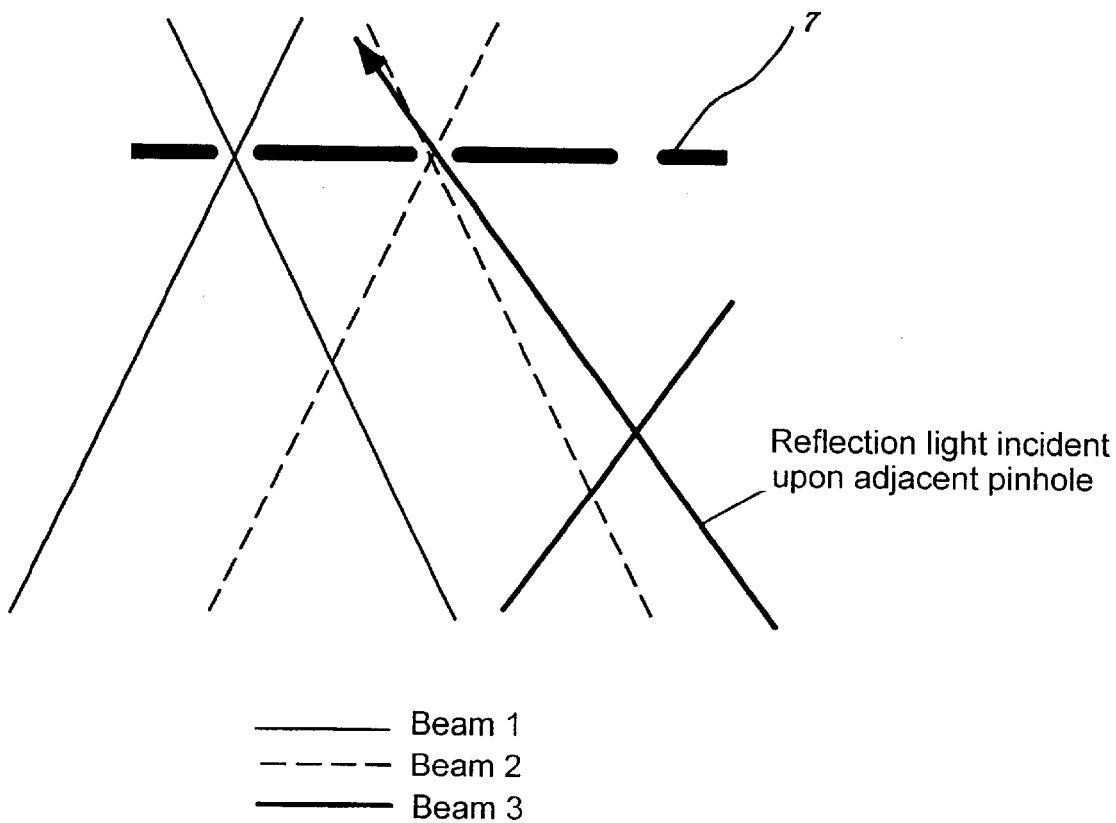
FIG. 14 is a schematic drawing for explaining a problem with the multibeam confocal optical system.

The sample of measurement is a package for a semiconductor chip called BGA (Ball Grid Array). The shape of the package is shown in FIG. 8. This type of package has a plurality of solder balls 142 arrayed on the base of the package. It is important for this package that the tops of all balls be aligned at the same height. If a conventional confocal image acquisition system is used to measure the height of the tops of the balls from the base, only the base plate 141 and the top parts of the solder balls 142 are measured as shown in FIG. 9, because the balls have a near-mirror surface that does not scatter light and hence the light reflected by the part of the surface slanted off the horizontal does not enter the objective lens. The problem with this measurement is that since there is too large a difference between the reflectances of the solder balls 142 and the package base 141 it is not possible to accurately measure the balls and the package base at the same time. If the illumination is set to the best intensity for the solder balls with a high reflectance of a near-half mirror, the intensity of illumination is far too low for accurate measurement of the package base 141.

This sixth embodiment obtains the reflection intensity map by the following simple fast procedure. First, a sufficiently intense illuminating light is shone onto the object by adjusting the light intensity control means or the illumination light intensity control means. Next, a blurred confocal image is captured at a Z position at which all pixels are evidently out of focus. In a confocal optical system, all pixels are dark and no image data can be obtained at this Z position in theory, but light is detected, though weak, because the size of the pinhole (pinholes) is not zero in practice. Since the weak light is still proportional to the intensity of reflection from the object, the reflection intensity map can be obtained. Once the reflection intensity map is obtained, the subsequent process is the same as that of the fifth embodiment.

A major difference from the fifth embodiment is that the method of this sixth embodiment uses only one image to obtain the reflection intensity map. As a result, this method needs only very little time for measurement, or for capturing one image, and also does not need computation as required for the method of the fifth embodiment.

A problem with this method is that the reflection intensity map thus obtained is blurred and low in accuracy. Especially, the intensity of reflection from the low-reflection area adjacent to the high-reflection area is strongly affected because the part of the light that is reflected from the high-reflection area and focused off the corresponding pinholes enters the pinholes corresponding to the low-reflection area. Therefore, an accurate intensity of reflection cannot be obtained for the low-reflection area adjacent to the high-reflection area.

In measurement of BGA packages, the area whose accurate intensity of reflection cannot be obtained is the area except for the top part of each ball. This part of the balls cannot be measured in principle because of its steep slant from the horizontal, and does not need to be measured for the purpose of the BGA measurement. Therefore, an accurate intensity of reflection is not required for this part of the balls. In brief, the problem described above is not an obstacle in applying this method of obtaining the reflection intensity map to measurement of BGA packages.

As described above, the present invention makes it possible to accurately measure high- and low-reflection regions or regular- and scatter-reflection regions at the same time in three-dimensional measurement by a confocal image acquisition system. In other words, the present invention greatly expands the dynamic range of a detector such as a CCD for measurement requiring a wide dynamic range for the detector. As a result, the confocal image acquisition system of the present invention becomes usable in a wider range of applications and plays a larger role in industry.

Obviously, numerous modifications and variations of the present invention are possible in light of the above teachings. It is therefore to be understood that, within the scope of the appended claims, the invention may be practiced otherwise than as specifically described herein.

What is claimed is:

1. An active confocal image acquisition apparatus comprising:

a multi-beam confocal optical system having optical elements emitting a plurality of spot- or slit-shaped illumination light beams simultaneously onto an object being measured, light intensity control means situated adjacent to the optical elements for adjusting and changing intensities of the spot- or slit-shaped illumination light beams individually without extinguishing the light beams, and a two-dimensional detector having detector elements and situated at a position to confocally detect intensities of the light beams reflected from the object to obtain confocal images corresponding to the optical elements.

2. An active confocal image acquisition apparatus comprising:

a multi-beam confocal optical system having optical elements emitting a plurality of spot- or slit-shaped illumination light beams simultaneously onto an object being measured, a two-dimensional detector having detector elements and situated at a position to confocally detect intensities of the light beams reflected from the object to obtain confocal images corresponding to the optical elements, and light intensity control means situated adjacent to the two-dimensional detector for adjusting and changing the intensities of the reflected light beams entering the individual detector elements of said two-dimensional detector separately without extinguishing the light beams.

3. The active confocal image acquisition apparatus of claim 1, in which said light intensity control means is a liquid crystal panel wherein transmittance of the light beams can be changed by control elements corresponding to pixels of the images.

4. The active confocal image acquisition apparatus of claim 1, further comprising focused position shifting means for bringing different parts of the object into focus in order along the optical axis, and processing and control means for performing processing of the images obtained and adjustment of said light intensity control means.

5. A method of measuring a three-dimensional shape of the object using the active confocal image acquisition apparatus of claim 4, which comprises the steps of:

setting the intensities of the light entering all detector elements of said detector to a low level;

capturing a plurality of confocal images bringing different parts of the object into focus by said focused position shifting means;

obtaining an extended focus image by collecting a greatest value among values of pixels at a same pixel position of the confocal images for all image pixels;

computing adjustment information for adjusting control elements of said light intensity control means so as to make the intensities of light entering all detector elements of said detector as close to a predetermined level as possible using values of the pixels of the extended focus image;

adjusting the control elements of said light intensity control means according to the adjustment information; and performing three-dimensional measurement by capturing a plurality of confocal images bringing different parts of the object into focus by said focused-position shifting means.

6. The method of measuring a three-dimensional shape of the object of claim 5, in which said extended focus image is produced by computing a true peak value for each pixel from the confocal images obtained by the capturing.

7. A method of measuring a three-dimensional shape of the object using the active confocal image acquisition apparatus of claim 4, which comprises the steps of:

setting the intensities of the light entering all detector elements of said detector to a high level;

capturing a blurred confocal image at a Z position at which all pixels are evidently out of focus;

determining adjustment information for adjusting control elements of said light intensity control means so as to make the intensities of light entering all the detector elements of said detector as close to a predetermined level as possible using values of the pixels of the blurred confocal image;

adjusting the control elements of said light intensity control means according to the adjustment information; and performing three-dimensional measurement by capturing a plurality of confocal images bringing different parts of the object into focus by said focused-position shifting means.

8. The active confocal image acquisition apparatus of claim 2, further comprising focused position shifting means for bringing different parts of the object into focus in order along the optical axis, and processing and control means for performing processing of the images obtained and adjustment of said light intensity control means.

9. A method of measuring a three-dimensional shape of the object using the active confocal image acquisition apparatus of claim 8, which comprises the steps of:

setting the intensities of the light entering all detector elements of said detector to a low level;

capturing a plurality of confocal images bringing different parts of the object into focus by said focused position shifting means;

obtaining an extended focus image by collecting a greatest value among values of pixels at a same pixel position of the confocal images for all image pixels;

computing adjustment information for adjusting control elements of said light intensity control means so as to make the intensities of light entering all detector elements of said detector as close to a predetermined level as possible using values of the pixels of the extended focus image;

adjusting the control elements of said light intensity control means according to the adjustment information; and performing three-dimensional measurement by capturing a plurality of confocal images bringing different parts of the object into focus by said focused-position shifting means.

10. The method of measuring a three-dimensional shape of the object of claim 9, in which said extended focus image is produced by computing a true peak value for each pixel from the confocal images obtained by the capturing.

11. A method of measuring a three-dimensional shape of the object using the active confocal image acquisition apparatus of claim 8, which comprises the steps of:

setting the intensities of the light entering all detector elements of said detector to a high level;

capturing a blurred confocal image at a Z position at which all pixels are evidently out of focus;

determining adjustment information for adjusting control elements of said light intensity control means so as to make the intensities of light entering all the detector elements of said detector as close to a predetermined level as possible using values of the pixels of the blurred confocal image;

adjusting the control elements of said light intensity control means according to the adjustment information; and performing three-dimensional measurement by capturing a plurality of confocal images bringing different parts of the object into focus by said focused-position shifting means.

12. The active confocal image acquisition apparatus of claim 1, wherein said light intensity control means changes an amount of the light beam passing therethrough as desired.

13. The active confocal image acquisition apparatus of claim 2, wherein said light intensity control means changes an amount of the light beam passing therethrough as desired.

* * * * *